United States Patent
Gardner

(10) Patent No.: US 7,444,691 B2
(45) Date of Patent: *Nov. 4, 2008

(54) STOW-AWAY BED

(75) Inventor: Stewart E. Gardner, Bristol, IN (US)

(73) Assignee: R-N-R International, Inc., Bristol, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/649,335

(22) Filed: Jan. 3, 2007

(65) Prior Publication Data

US 2007/0180613 A1    Aug. 9, 2007

Related U.S. Application Data

(63) Continuation-in-part of application No. 11/284,314, filed on Nov. 21, 2005, now Pat. No. 7,178,180.

(60) Provisional application No. 60/630,087, filed on Nov. 22, 2004.

(51) Int. Cl.
*A47C 17/84* (2006.01)

(52) U.S. Cl. ............... 5/10.1; 5/118; 5/9.1; 296/190.02

(58) Field of Classification Search ............... 5/9.1, 5/10.1, 10.2, 118, 169, 170, 103, 412, 131; 296/190.02
See application file for complete search history.

(56) References Cited

U.S. PATENT DOCUMENTS

| | | | | | |
|---|---|---|---|---|---|
| 3,480,975 | A | * | 12/1969 | Colchin et al. | 5/118 |
| 3,623,168 | A | * | 11/1971 | Rouch | 5/10.1 |
| 3,745,595 | A | * | 7/1973 | Nagy | 5/9.1 |
| 3,829,912 | A | * | 8/1974 | Quakenbrush | 5/10.2 |
| 5,638,559 | A | * | 6/1997 | Natri et al. | 5/10.2 |
| 7,178,180 | B2 | * | 2/2007 | Gardner | 5/10.1 |

* cited by examiner

*Primary Examiner*—Michael Trettel
(74) *Attorney, Agent, or Firm*—R. Tracy Crump

(57) ABSTRACT

A stow-away bed is disclosed that includes a flat rectangular deck pivotally mounted between opposed vehicle end walls by a pair of parallel swing arms. The parallel swing arms allow the bed deck to remain horizontal as the deck is manually swung between the storage and sleep positions. The stow-away bed is pivotally mounted between opposed vehicle end walls for movement between a sleep position where the bed deck is suspended adjacent the vehicle ceiling and a sleep position, where the bed deck is suspended from the vehicle ceiling. In one embodiment, a pair of elastic cords connect the bed deck to the vehicle side wall. The elastic cords pull the bed deck toward the vehicle sidewall and help hold the bed deck in the sleep position. In another embodiment, a chain drive and piston prop are incorporated to assist in moving the bed between the storage and sleep positions.

5 Claims, 10 Drawing Sheets

STOW-AWAY BED

This is a continuation-in-part of U.S. patent application Ser. No. 11/284,314 filed on Nov. 21, 2005 now U.S. Pat. No. 7,178,180, which claims benefit of U.S. provisional patent application, Ser. No. 60/630,087 filed Nov. 22, 2004.

This invention relates to stow-away beds, and specifically, a swinging stow-away bed used in recreational vehicles.

BACKGROUND AND SUMMARY OF THE INVENTION

Stow-away beds, seats and tables are common features in recreational vehicles where living space is limited. Stow-away beds, seats and tables are designed to be quickly and conveniently stored to increase living space when not in use. The present invention seeks to provide an improved stow-away bed, seat, table or similar structure for recreational vehicles.

The stow-away bed embodying the teachings of the present invention includes a flat rectangular deck pivotally mounted between opposed vehicle end walls by a pair of parallel swing arms. The parallel swing arms allow the bed deck to remain in a horizontal position as the deck is manually swung between the storage and sleep positions. The stow-away bed is pivotally mounted between opposed vehicle end walls for movement between a storage position where the bed deck is suspended adjacent the vehicle ceiling and a sleep position where the bed deck is suspended from the vehicle ceiling. In one embodiment of this invention, a pair of elastic cords connect the bed deck to the vehicle side wall. The elastic cords pull the bed deck toward the vehicle sidewall and help hold the bed deck in the sleep position. In another embodiment, a chain drive and piston prop are incorporated to assist in moving the bed between the storage and sleep positions.

Accordingly, the present invention provides a simple stow-away bed design that is simple to operate and economical to produce. The bed uses a simple parallel swing arm design, which is easy to manually operate and maintain. Furthermore, the present invention can readily be configured as a bed, seat or table. These and other advantages of the present invention will become apparent from the following description of the embodiments of the invention with reference to the accompanying drawings.

BRIEF DESCRIPTION OF THE DRAWINGS

The drawings illustrate two embodiments of the present invention, in which.

DESCRIPTION OF THE PREFERRED EMBODIMENT

Figure 1:
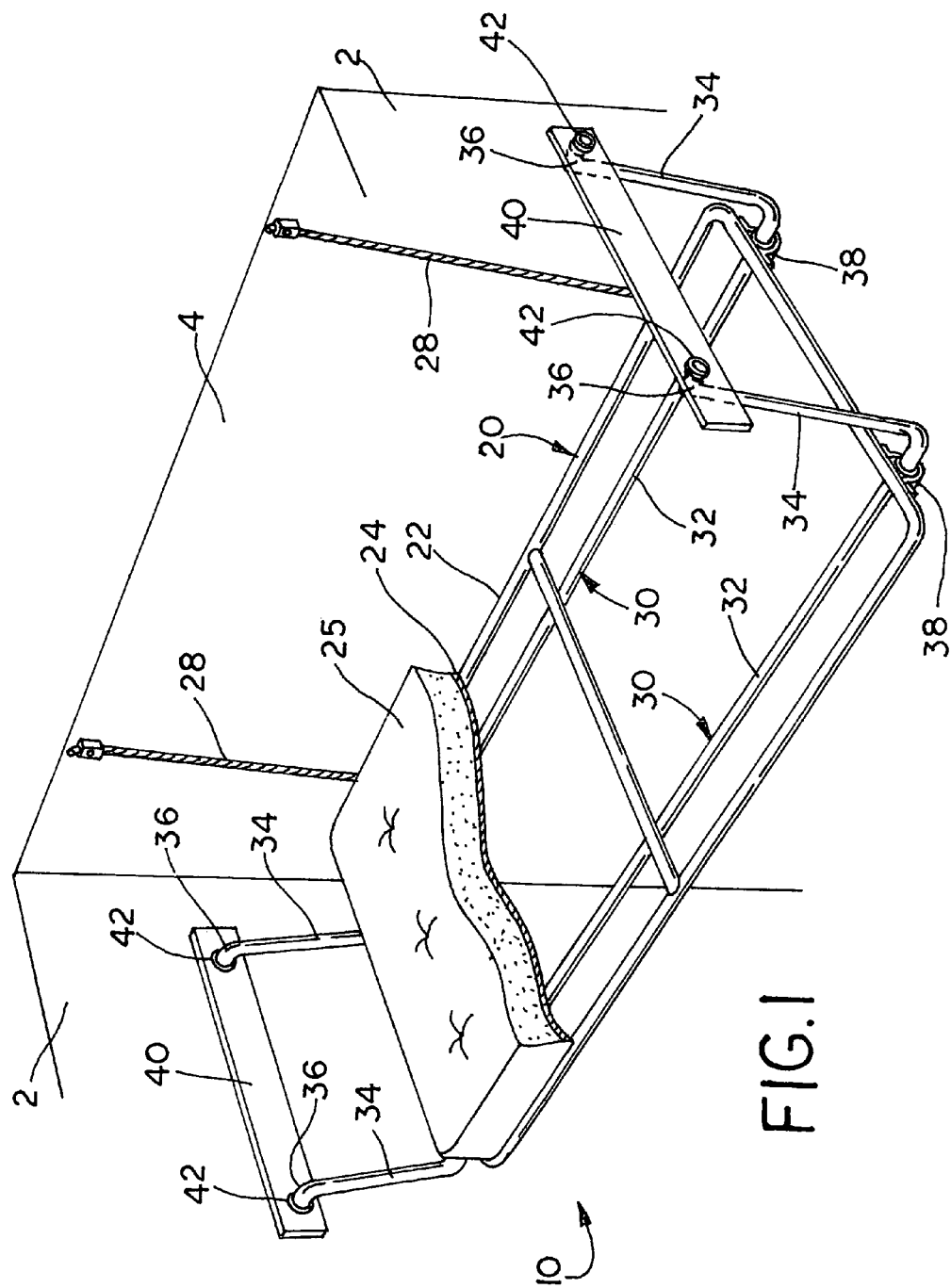
FIG. 1 is a perspective view of an embodiment of the present invention showing a swinging stow-away bed with portions cut away.
Figure 2:
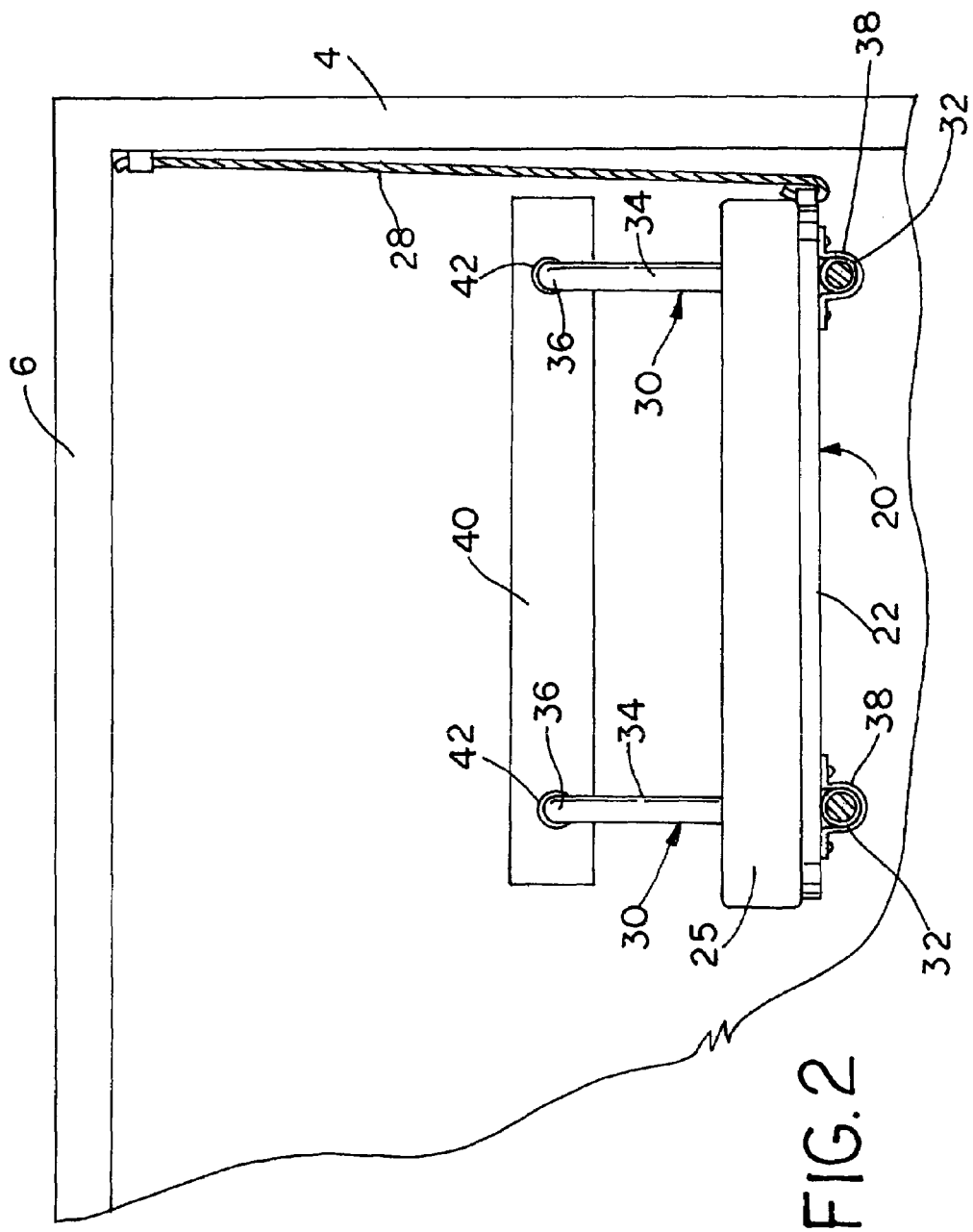
FIG. 2 is an end view of the bed of FIG. 1 illustrating the bed in the sleep position.
Figure 3:
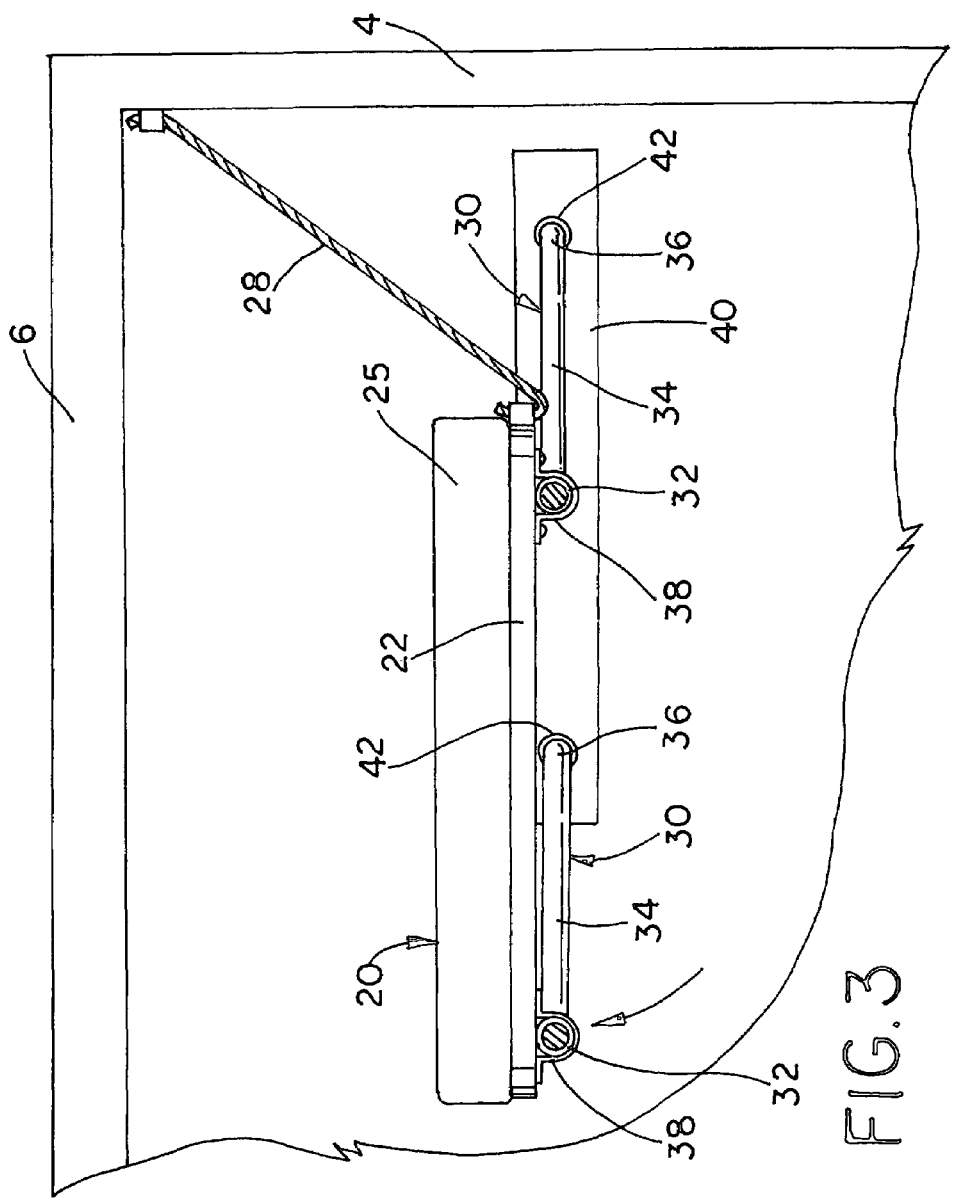
FIG. 3 is an end view of the bed of FIG. 1 illustrating the bed shifting from the sleep position.
Figure 4:
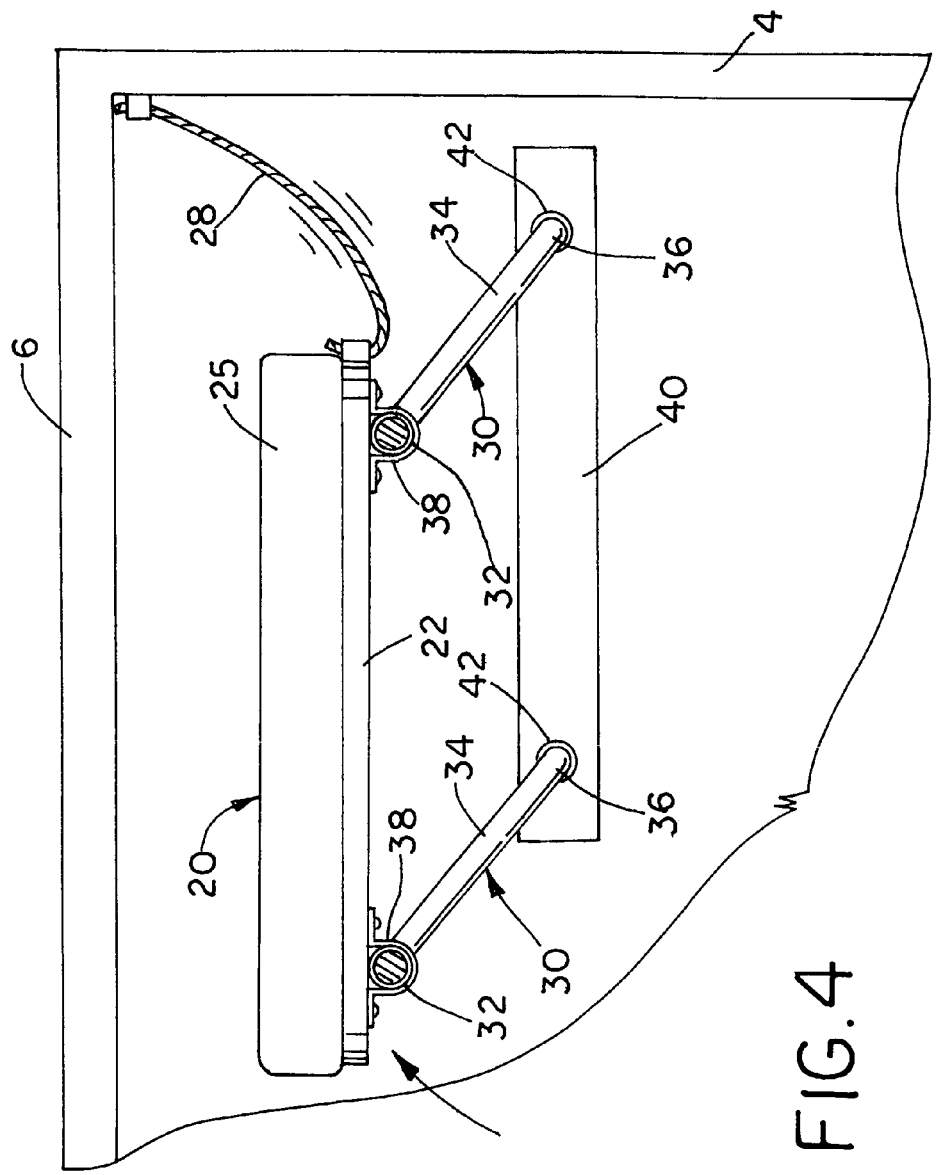
FIG. 4 is another end view of the bed of FIG. 1 illustrating the bed in the sleep position.
Figure 5:
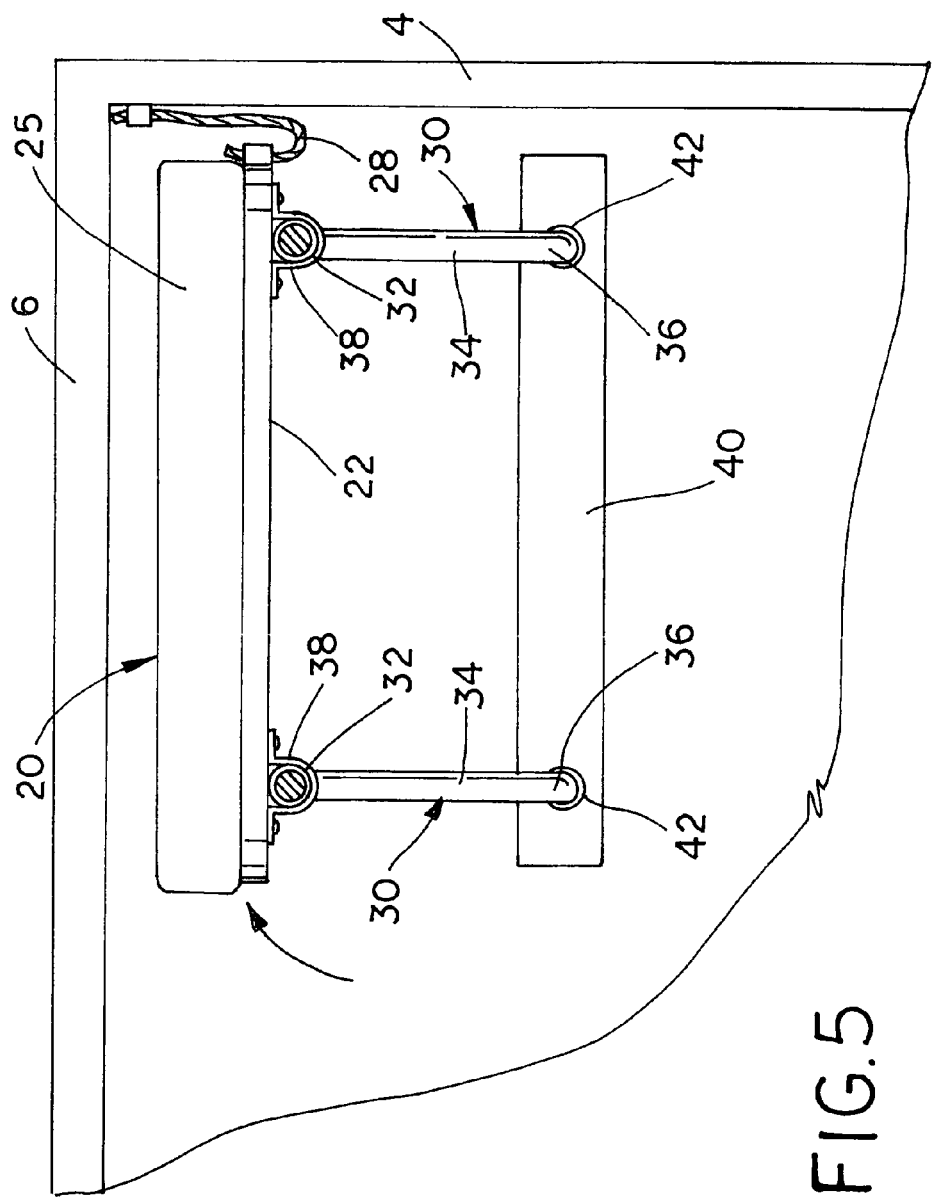
FIG. 5 is an end view of the bed of FIG. 1 illustrating the bed in the storage position.
Figure 6:
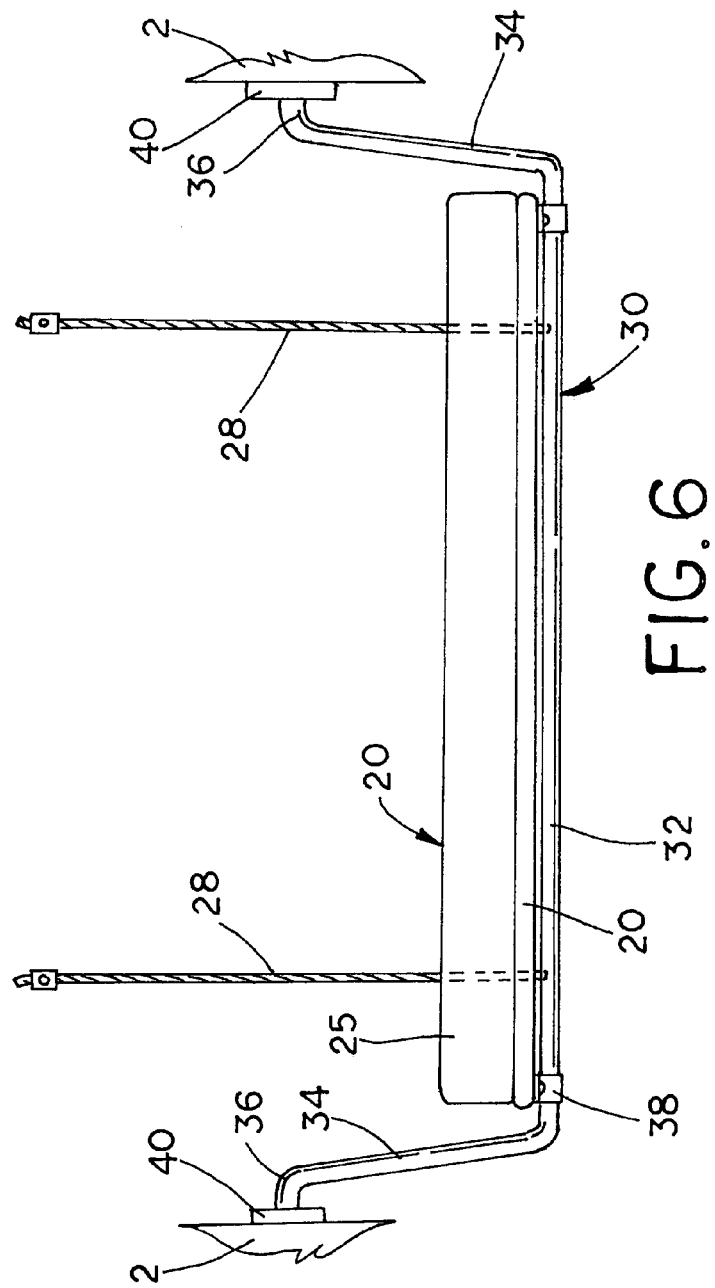
FIG. 6 is a front side view of the bed of FIG. 1 illustrating the bed in the sleep position.
Figure 7:
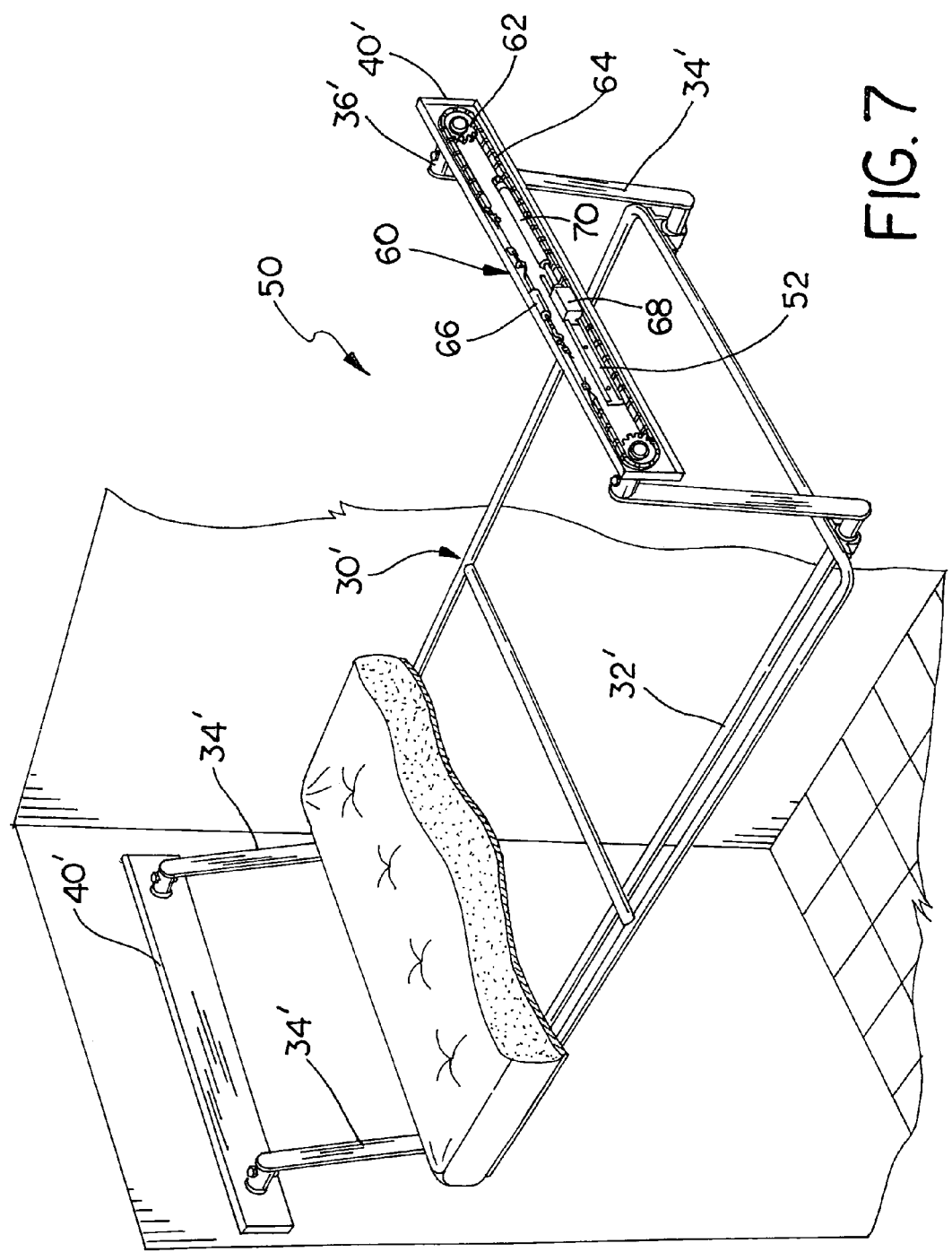
FIG. 7 is a perspective view of an alternative embodiment of the swinging stow-away bed with portions cut away.

Referring now to FIGS. 1-6, reference numeral 10 generally designates the stow-away bed, which forms an embodiment of the present invention. As shown, bed 10 includes a flat rectangular horizontal deck 20 pivotally mounted between opposed vehicle end walls 2 by a pair of parallel swing arms 30. Deck 20 supports a mattress or seat cushion, but can also serve as a table top if necessary. Deck 20 includes a support frame 22, upon which a sturdy sheet of plywood 24 or other suitable decking material is bolted. Deck frame 22 is generally constructed of steel or aluminum tubing. Swing arms 30 are constructed from a length of steel or aluminum tubing and have a U-shaped configuration. The length of tubing has two 90 degree bends that form a long horizontal section 32 and two opposed end sections 34. Horizontal sections 32 of each swing arm 30 extend longitudinally across the bottom of deck frame 22 and are pivotally secured to deck frame 22 by journal brackets 38, which allow end sections 34 to pivot about a plane perpendicular to deck 20. Each end section 34 terminates in a foot 36 that is journalled in mounting bar 40 fixed to vehicle end walls 2. Swing arm feet 36 are rotatably seated within a bearing or sleeve 42 fitted in a bore of each mounting bar 40. A pair of elastic cords 28 are connected between deck frame 22 and the vehicle side wall 4. As shown, bed 10 is pivotally mounted between opposed vehicle end walls 2 for movement between a sleep position (FIGS. 1, 2 and 6) and a storage position (FIG. 5). In the storage position, deck 20 is rotated over mounting bars 40 and is suspended adjacent the vehicle ceiling 6. In the sleep position, deck 20 is rotated below mounting bars 40 and is suspended from vehicle ceiling 6. The pivotal connection of parallel swing arms 30 and deck 20 allows the deck to remain substantially horizontal as the deck is manually swung between the storage and sleep positions. As shown in FIGS. 2-5, end sections 34 of swing arms 30 move in parallel with each other pivoting about four parallel horizontal axis as deck 20 is manually swung between the storage and sleep positions. This motion of the pair of parallel swing arms 30 is best described as a "pivoting parallelogram" and ensures that deck 20 remains horizontal as the bed is swung between the storage and sleep positions. As shown in FIGS. 2 and 3, elastic cords 28 are used to exert a force on deck 20 to pull the deck back toward vehicle side wall 4. The tension in elastic cords 28 helps hold deck 20 in the sleep position by pulling the deck towards vehicle side wall 4 so that the pivot points of swing arms 30 are vertically past center. Elastic cords 28 also reduce the tendency of deck 20 to swing. It should be noted that in the storage position, deck 20 will come to rest against vehicle sidewall 4 so that the pivot points of swing arms 30 are vertically past center, thereby securing the deck in the storage position.

Figure 8:
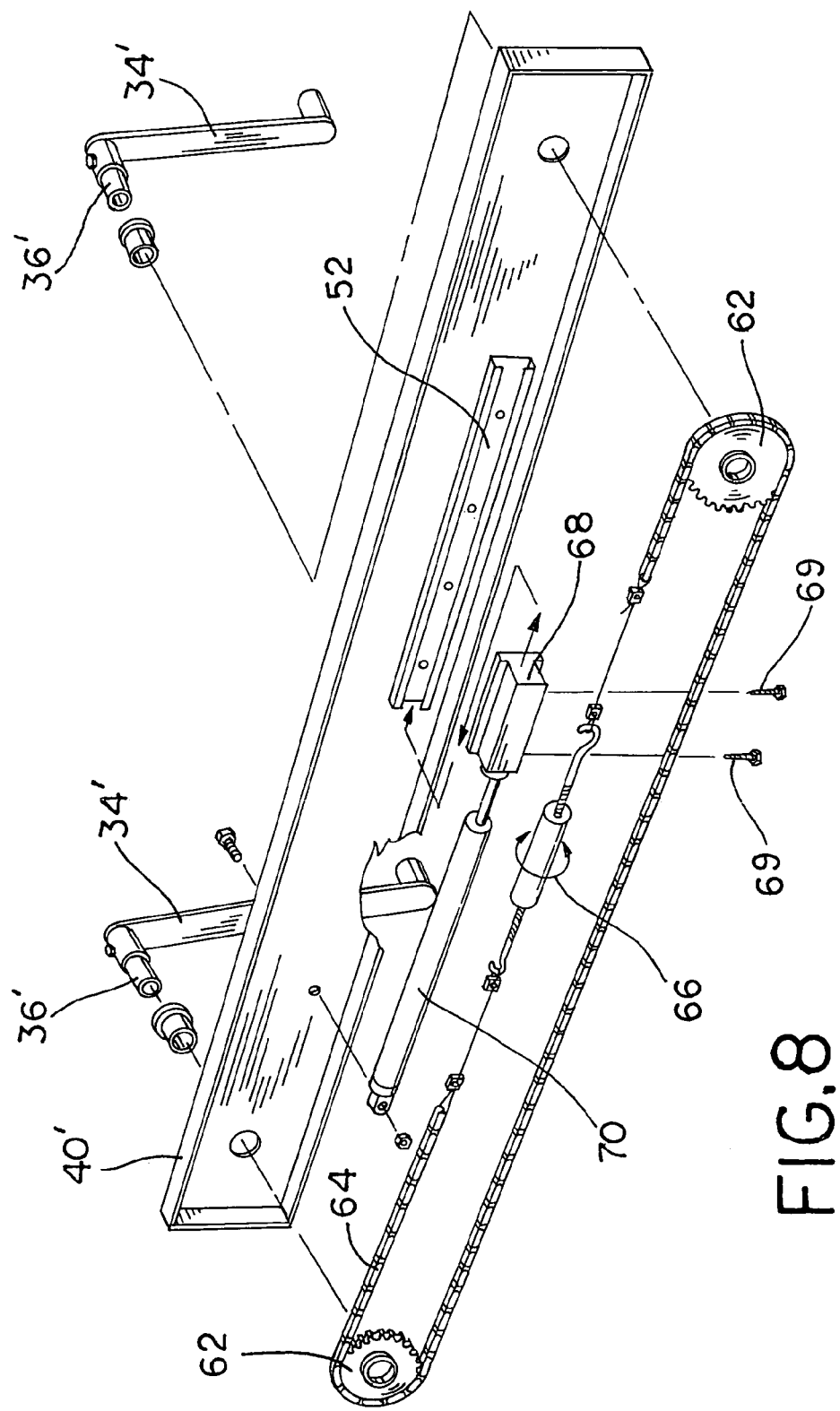
FIG. 8 is an exploded view of the chain driven gas prop mechanism of the bed of FIG. 7.
Figure 9:
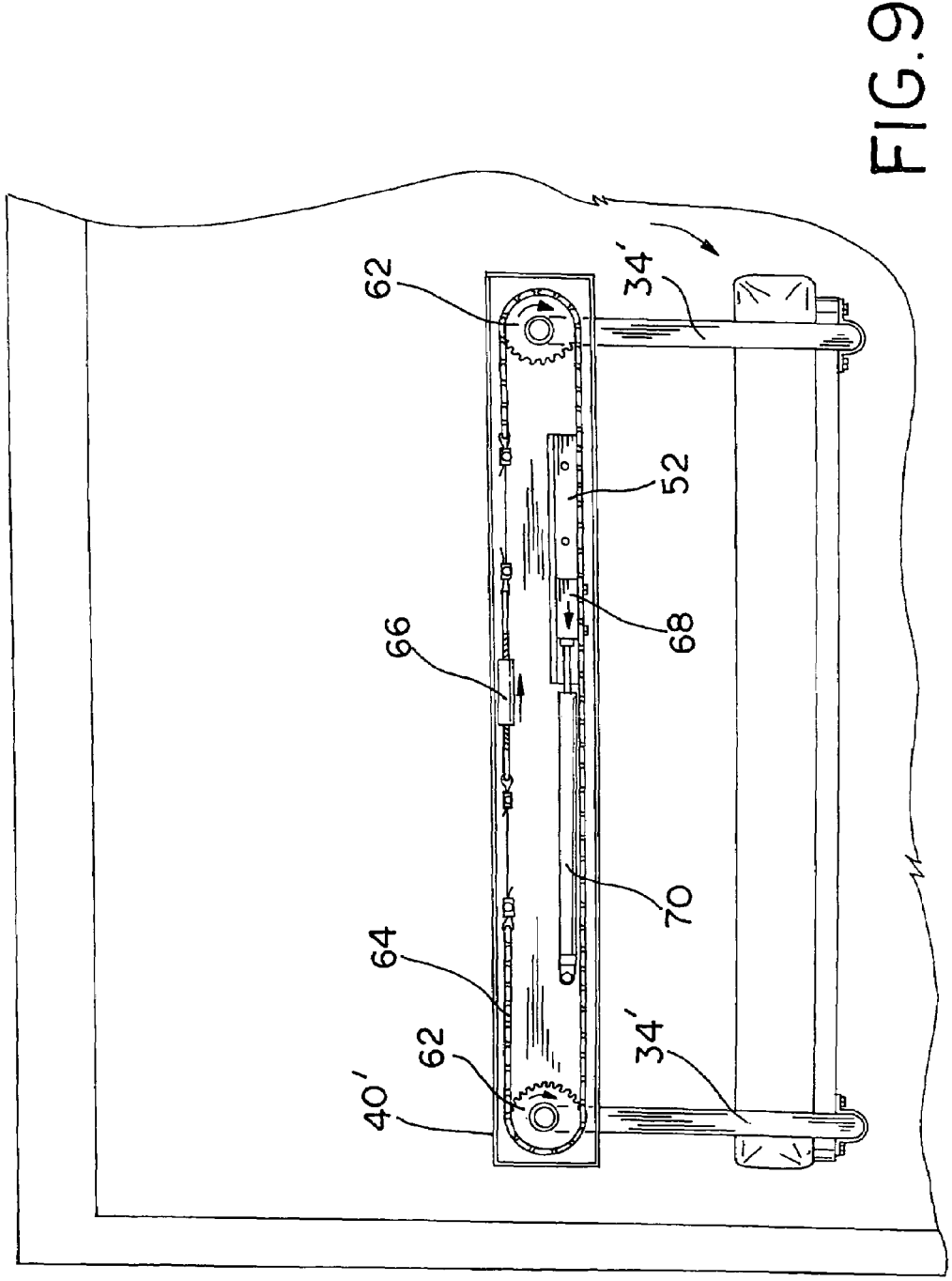
FIG. 9 is an end view of the bed of FIG. 7 illustrating the bed in the sleep position.
Figure 10:
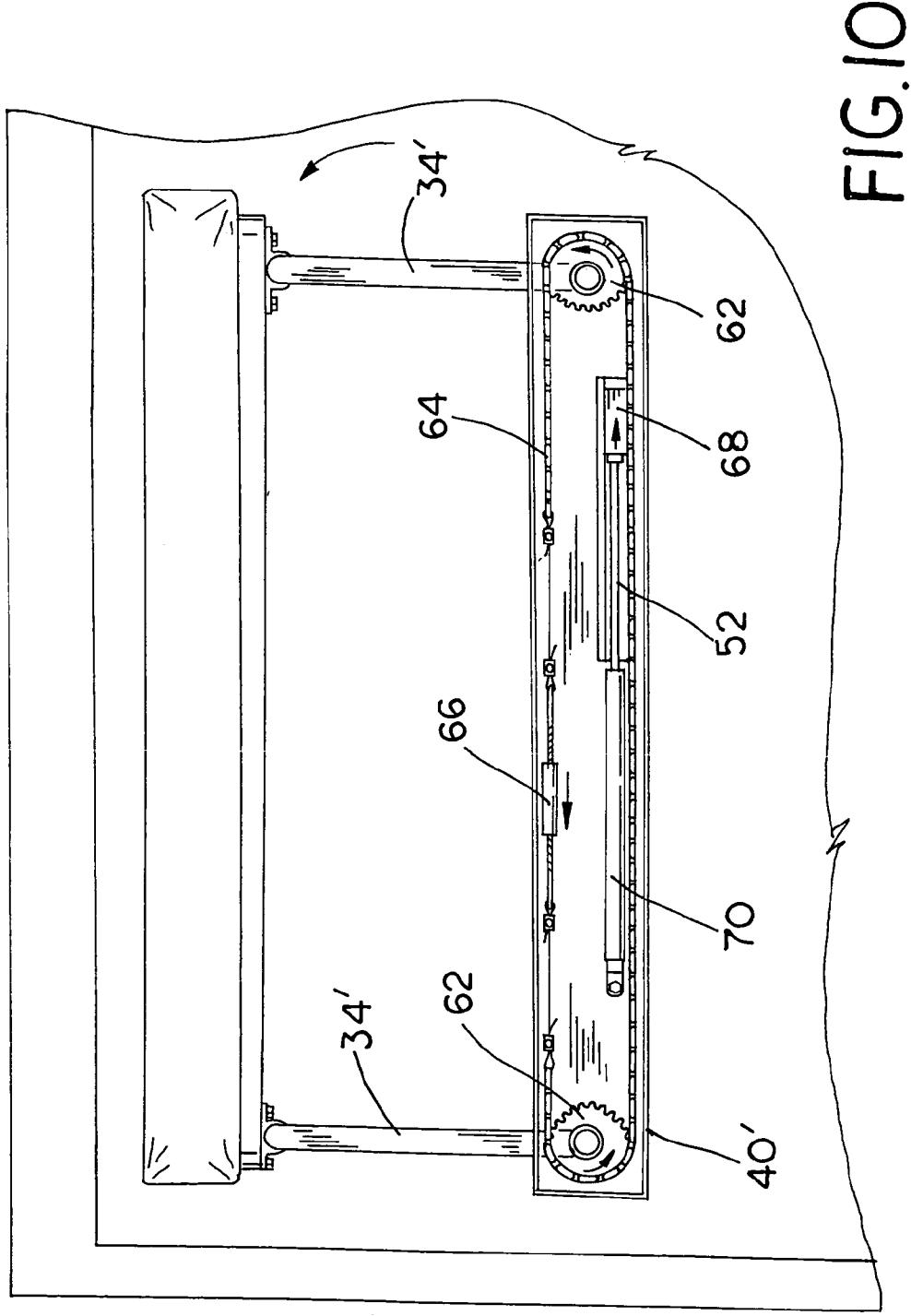
FIG. 10 is an end view of the bed of FIG. 7 illustrating the bed in the storage position.

FIGS. 7-10 illustrate a second embodiment of the stow-away bed of this invention, which is designated generally by reference numeral 50. Bed 50 is substantially the same as bed 10, but includes lift mechanism 60 housed within one of the mounting bars 40' to assist in moving the bed between the storage and sleep positions. As shown in FIG. 8, lift mechanism 60 includes a sprocket 62 mounted to each swing arm foot 36'. A link chain 64 is trained about sprockets 62 with the ends of the chain connected and a turnbuckle 66. A slide block 68 is seated within a slide track 52, which is horizontally mounted to the inside of bar 40'. Slide block 68 is secured to chain 64 by two screws 69, which extend through two links in the chain. A pneumatic or hydraulic piston prop 70 is mounted to the inside of bar 40' and operably connected to slide block 68. When bed 50 moves between the storage and sleep positions, swing arm feet 36' rotate, which turns sprockets 62 and drives chain 64. The movement of chain 64 reciprocates slide block 68 along track 52. Piston prop 70 exerts force on slide block 68 to assist in moving bed 50 between the storage and sleep positions. Piston prop 70 also provides resistance to hold bed 50 in either the storage or sleep positions. When bed 50 is in the sleep position (FIG. 9), swing arms 30' are rotated so that piston prop 70 is compressed. While piston prop 70 exerts force on slide block 68, the weight of bed 50 is sufficient to hold bed 50 in the sleep position. As a user begins to move bed 50 from the sleep position to the storage position, the force exerted by piston prop 70 on slide block 68 helps lift the bed into the storage position. When bed 50 is in the storage position (FIG. 10), swing arms 30' are rotated so that piston prop 70 is extended, which helps hold the bed in the storage position. It should also be noted that horizontal sections 32' and end sections 34' of swing arms 30' are detachable, which allows bed 50 and lift mechanism to be easily installed in any application.

While FIGS. 7-10 illustrate the lift mechanism using a chain drive and gas prop, other mechanical arrangements can be incorporated within the teachings of this invention. For example, a simple linkage can be used to connect the prop to the swing arm end. In addition, simple springs can be used in place of the prop to provide the force needed to assist in the raising and lowering of the deck. The particular mechanism employed is selected for efficiency and simplicity of operation, and to be compact so as to be enclosed within the mounting bar.

One skilled in the art will note that the present invention has several advantages over stow-away beds, seats and tables used in recreational vehicles. The bed embodying this invention can be used in any conventional recreational vehicle or other application where space is limited. The present invention provides a simple stow-away bed design that is economical to produce and can be readily configured for use as a bed, seat or table. The bed uses a simple parallel swing arm design, which is easy to manually operate and maintain. In one embodiment, the bed uses elastic cords to safely secure the bed in its sleep position. In an alternative embodiment, the bed incorporates a chain drive and piston prop to assist in moving the bed between the storage and sleep positions.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A stow-away bed for use in an area defined by spaced end walls and a side wall extending between the end walls, the bed comprising:
    a deck for supporting a mattress thereon, the deck having a first end and second end opposite the first end;
    a mounting bar secured horizontally to each of the end walls;
    a pair of parallel U-shaped swing arms pivotally mounted between the end walls, each of the pair of swing arms having an elongated middle section and two opposed end sections, each swing arm end section pivotally connected to one of the mounting bar, the deck seated atop the pair of swing arms for movement between a storage position where the deck is spaced above the mounting bars and a sleep position where the deck is suspended below the mounting bars; and
    a lift means for providing force to assist in moving the deck as the deck is shifted between the storage position and the sleep position and to secure the deck in the storage position.

2. The stow-away bed of claim 1 wherein the lift means includes a piston prop mounted to the mounting bar and operably connected to one of the swing arm end sections for exerting force on the swing arm end.

3. The stow-away bed of claim 2 wherein the lift means includes a sprocket connected to one of the swing arm end sections and an elongate chain trained about the sprocket and connected to the piston prop.

4. The stow-away bed of claim 3 wherein the mounting bar has an interior, the piston prop, the sprocket and the chain disposed within the mounting bar interior.

5. A stow-away bed for use in an area defined by spaced end walls and a side wall extending between the end walls, the bed comprising:
    a deck for supporting a mattress thereon, the deck having a first end and second end opposite the first end;
    a mounting bar secured horizontally to each of the end walls, the mounting bar having an interior therein;
    a pair of parallel U-shaped swing arms pivotally mounted between the end walls, each of the pair of swing arms having an elongated middle section and two opposed end sections, each swing arm end section pivotally connected to one of the mounting bar, the deck seated atop the pair of swing arms for movement between a storage position where the deck is spaced above the mounting bars and a sleep position where the deck is suspended below the mounting bars;
    a sprocket connected to each of the swing arm end sections and disposed within the mounting bar interior whereby rotation of the sprockets pivots the pair of swing arms;
    a chain trained about the sprockets within the mounting bar interior; and
    a piston prop mounted within the mounting bar interior and operably connected to the chain for exerting force on the pair of swing arms to assist in moving the deck as the deck is shifted between the storage position and the sleep position and to secure the deck in the storage position.

\* \* \* \* \*